United States Patent Office 3,574,221
Patented Apr. 6, 1971

3,574,221
DERIVATIVES OF AMINOALKYL PYRIDINES
Olga Hankovszky, Kálmán Hideg, Gyula Méhes, László Decsi, and Mária Várszegi, Pecs, Hungary, assignors to Egyesult Gyogyszer-Es Tapszergyar, Budapest, Hungary
No Drawing. Continuation-in-part of application Ser. No. 641,164, May 25, 1967. This application Oct. 2, 1969, Ser. No. 863,382
Claims priority, application Hungary, May 28, 1966, EE 1,251
Int. Cl. C07d 31/42
U.S. Cl. 260—294.8                                     1 Claim

ABSTRACT OF THE DISCLOSURE

The invention relates to novel 2-pyridylethyl-benzylamine derivatives having the general formula

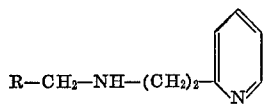

wherein R is a mono-, di- or trisubstituted phenyl group, and the substituents of the phenyl group can be hydroxy, alkoxy containing 1 or 2 carbon atoms, methylenedioxy, nitro, dimethylamino or halogen groups. These compounds as well as their therapeutically acceptable acid addition salts and quaternary ammonium derivatives possess valuable analgesic and tranquillo-sedative activity.

CROSS REFERENCE TO PRIOR APPLICATIONS

This is a continuation-in-part of our copending application Ser. No. 641,164 filed May 25, 1967, and now abandoned.

This invention relates to new 2-pyridylethyl-benzylamine derivatives having analgesic and tranquillo-sedative activity. More particularly, this invention relates to compounds having the general Formula I

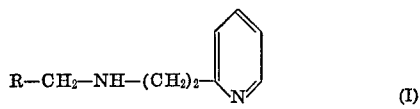

wherein R is selected from the group consisting of mono-, di- and trisubstituted phenyl radicals, wherein the substituents of the phenyl radical are selected from the group consisting of hydroxy, alkoxy containing from 1 to 2 carbon atoms, methylenedioxy, nitro, dimethylamino and halogen radicals, and to the pharmaceutically acceptable acid addition salts and quaternary derivatives thereof.

It is known that some aminoalkyl pyridines, e.g. the 1-(6-methyl-2-pyridyl)-2-aminopropane, have analgesic activity, but they show also toxic side effects. The 1-(6-methyl-2-pyridyl)-2-aminopropane itself produces marked analgesia in a dosis of 7 mg./kg., its therapeutic index (1:3) is, however, very unfavourable (Alfred Burger: "Medicinal Chemistry," 2nd Edition, Interscience Publishers Inc., New York, 1960, pp. 332 to 333).

Now it has been found that the compounds according to the invention show a much better effect on the central nervous system than the known compounds, and their toxicity is much lower. The compounds according to the invention exhibit several useful pharmacological actions. They have a tranquillo-sedative effect many times superior to that of trimetozine [N-(3,4,5-trimethoxybenzoyl)-morpholine] or meprobamate (2 - methyl - 2-propyl-1,3-propanediol dicarbamate), at appropriate therapeutic ratios, moreover they show a marked analgesic effect. Among the compounds of the invention, 2-[beta - (3,4 - dimethoxy-benzyl)-aminoethyl]-pyridine proved to be the most useful with respect to its tranquillo-sedative activity.

The invention includes all the stereoisomers and stereoisomeric mixtures of the compounds having the general Formula I, not only in free-base form, but also their acid addition salts and quaternary ammonium derivatives.

The compounds of the present invention are conveniently prepared by reacting an aldehyde of the general Formula II $$R\text{—}CHO \qquad (II)$$

wherein R has the same meanings as above, with 2-aminoethyl pyridine of the Formula III

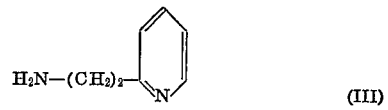
(III)

and selectively reducing in a known way the compound thus obtained having the general Formula IV

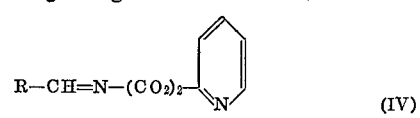
(IV)

wherein R has the same meanings as above, and, if desired, converting the obtained free base having the general Formula I in a known way to a pharmaceutically acceptable salt or a quaternary ammonium derivative.

The reduction of the compound having the general Formula IV is conveniently carried out with lithium aluminium hydride, preferably in absolute ether, or with sodium borohydride, preferably in an alcohol. The reduction can be carried out also by catalytic hydrogenation. Thereafter the obtained complex is decomposed, preferably with water.

The new compounds of the general Formula I possess basic properties and form acid addition salts as well as quaternary ammonium derivatives.

As indicated above, the new compounds according to the invention occur equally in the free base, acid addition salt and quaternary forms. In some instances it can be desirable to obtain the acid salt or the quaternary ammonium derivative from the free base. In this case, the salt can be prepared by reacting the free base with the corresponding inorganic or organic acid, such as hydrochloric, hydrobromic, maleic, fumaric, ethansulphonic, 1,1'-methylene-bis-(2-naphthol-3-carboxylic), sulphuric, phosphoric, acetic, citric and other pharmaceutically acceptable acids, preferably in the presence of a suitable solvent permitting isolation of the salt. The quaternary derivatives can be prepared by reacting the free base with a halogen alkyl compound, preferably in the presence of an indifferent solvent, whereafter, if not both nitrogen atoms are quaternarized, the non-quaternarized nitrogen can be transformed to an acid salt.

On the other hand, in those instances where it is desired to convert the acid salt or the quaternary ammonium derivative to the base, this can be accomplished by dissolving the salt in a suitable solvent, neutralizing the solution with a basic material, such as sodium hydroxide and the like, and isolating the desired base by extraction or other suitable means.

The compounds of the general Formula I as well as their salts and quaternary derivatives can be transformed to pharmaceutically usable products by adjusting them alone or combined with biologically active compounds, if desired, together with carrier, binding, filling, surface-active, flavouring etc. agents usable in the pharmaceutical industry (e.g. starch, lactose, calcium carbonate, talc, magnesium stearate, polyalkyleneglycols, etc.) in a known way to medicines. The oral compositions contain preferably 10 to 500 mg. of active ingredient pro dosage units. The active ingredients can be administered to adults preferably in a daily dose of 0.005 to 1.00 g., depending on the compound used and on the state of the patient.

The invention is further illustrated by the aid of the following examples which are given for the purpose of illustration only and are not to be construed as limit of invention in spirit or in scope.

EXAMPLE 1

A solution of 15.10 g. (0.1 mole) of p-nitrobenzaldehyde and 12.20 g. (0.1 mole) of 2-(beta-amino-ethyl)-pyridine with 200 ml. of xylene is boiled for an hour under reflux. During this time 1.8 ml. (0.1 mole) of water are condensed in the water-separating head mounted to the flask. The solution containing xylene is evaporated under vacuum. The crystalline residue is recrystallized from benzene. In this way 17.36 g. (68%) of 2-[beta-(p-nitrobenzene)-aminoethyl]-pyridine are obtained with a melting point of 100–103° C.

12.76 g. (0.05 mole) of the thus-obtained Shiff base are reacted in 200 ml. of abs. alcohol with 3 g. of $NaBH_4$ by maintaining the reaction components for 10 minutes at room temperature and thereafter boiling them for 20 minutes under reflux. The obtained complex is decomposed with water and, after distilling off the alcohol, the reaction mixture is extracted with 3×50 ml. of ether. The extract containing ether is evaporated. The residue is dissolved in 100 ml. of acetone and treated with charcoal. The filtrate is made acid with a 1:1 mixture of hydrochloric acid and alcohol. The obtained dihydrochloride is crystallized from the mixture of 100 ml. of alcohol and 100 ml. of acetone. In this way 15.18 g. (92%) of 2-[beta-(p-nitrobenzyl)-aminoethyl]-pyridine are obtained with a melting point of 230° C. (decomposition).

The compounds having the general Formula I obtained by the same method as described above are given in the following table.

| Example No. | R | Yield, percent | M.P. °C. | Formula | Molecular weight |
|---|---|---|---|---|---|
| 2 | 2—$HOC_6H_4$— | 50 | 178–180 | $C_{14}H_{16}N_2O.2HCl$ | 301.22 |
| 3 | 4—$HOC_6H_4$— | 25 | 102–103 | $C_{14}H_{16}N_2O.2HCl$ | 301.22 |
| 4 | 4—$CH_3OC_6H_4$— | 50 | 89–92 | $C_{15}H_{18}N_2O.2HCl$ | 315.26 |
| 5 | 3—$CH_3O,4$—$HOC_6H_3$— | 72 | 178–180 | $C_{15}H_{18}N_2O_2.2HCl$ | 331.26 |
| 6 | 3,4—$(CH_3O)_2C_6H_3$— | 80 | 174–177 | $C_{16}H_{20}N_2O_2.2HCl$ | 345.28 |
| 7 | 3,4,5—$(CH_3O)_3C_6H_2$— | 75 | 160–162 | $C_{17}H_{22}N_2O_3.2HCl$ | 375.31 |
| 8 | 4—$NO_2C_6H_4$— | 92 | 230 (dec) | $C_{14}H_{15}N_3O_2.HCl$ | 330.22 |
| 9 | 4—$(CH_3)_2NC_6H_4$— | 78 | 175–176 | $C_{16}H_{21}N_3.3HCl$ | 364.77 |
| 10 | 4—$C_2H_5OC_6H_4$— | 50 | 153–155 | $C_{16}H_{20}N_2O.2HCl$ | 329.28 |
| 11 | 3,4—$(OCH_2O)C_6H_3$— | 50 | 113–116 | $C_{15}H_{16}N_2O_2.2HCl$ | 329.24 |
| 12 | 3—$CH_3O,4$—$C_2H_5OC_6H_3$ | 70 | 149–151 | $C_{17}H_{22}N_2O_2.2HCl$ | 359.31 |
| 13 | 4—$ClC_6H_4$ | 65 | 194–195 | $C_{14}H_{15}ClN_2.2HCl$ | 319.67 |

The results of pharmacological tests to determine the tranquillo-sedative activity, the analgesic activity and the intraperitoneal $LD_{50}$ values of some compounds are given in the following table.

| Compound (Example No.) | $LD_{50}$ mg./kg., i.p. | Tranquillo-sedative activity | | | | Analgesic activity $ED_{50}$ mg./kg., i.p |
|---|---|---|---|---|---|---|
| | | Oriental hypermotility | | Desoxyephedrin-blocking activity | | |
| | | $ED_{50}$ mg./kg., i.p. | R.a. | $ED_{50}$ mg./kg., i.p. | R.a. | |
| 4 | 135 | 32 | 1.62 | 28.0 | 5.36 | 3.78 |
| 5 | 220 | 32.5 | 1.6 | 30 | 5.0 | 28 |
| 6 | 150 | 10.5 | 4.95 | 22 | 6.82 | 21.5 |
| 7 | 220 | 50 | 1.04 | 40 | 3.75 | 12.5 |
| 9 | 85 | 15.5 | 3.36 | 9.2 | 16.3 | 7.8 |
| 10 | 125 | 83 | 2.26 | 25 | 6.0 | 19.5 |

Note.—R.a.=relative activity in comparison with trimetozine.

The tranquillo-sedative activity was examined by means of photoelectric measurements. Both the effect on the oriental hypermotility, and the desoxyephedrin-blocking activity were determined on mice. The analgesic activity was investigated by the hot-plate method on mice.

What we claim is:

1. A member selected from the group consisting of pharmaceutically active 2-pyridylethyl-benzyl-amine derivatives having the general Formula I.

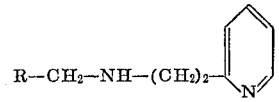

wherein R is selected from the group consisting of mono-, di- and trisubstituted phenyl radicals, wherein the substituents of the phenyl radical are selected from the group consisting of hydroxy, alkoxy containing from 1 to 2 carbon atoms, methylenedioxy, nitro, dimethylamino and halogen radicals, and the pharmaceutically acceptable acid addition salts and quaternary ammonium derivatives thereof.

References Cited

UNITED STATES PATENTS 2,792,403   5/1957   Blicke _____ 260—296

JOHN D. RANDOLPH, Primary Examiner

S. D. WINTERS, Assistant Examiner

U.S. Cl. X.R.

260—240, 240.9, 295, 296; 424—263